S. H. AND R. A. GARBER.
HAY LOADER.
APPLICATION FILED MAY 20, 1918.

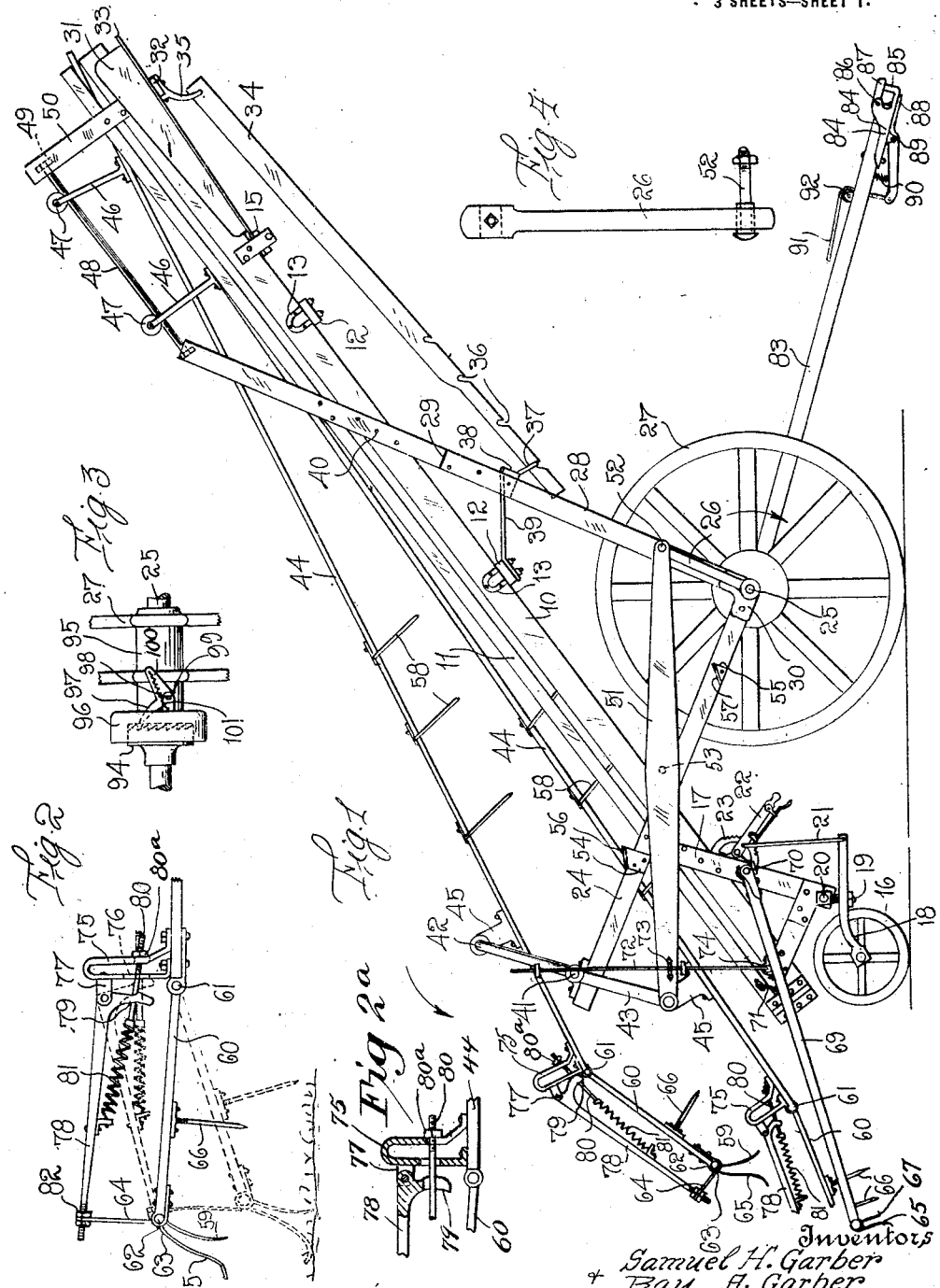

1,365,392.

Patented Jan. 11, 1921.
3 SHEETS—SHEET 2.

Inventors
Samuel H. Garber
& Ray A. Garber
By Watson E. Coleman
Attorney

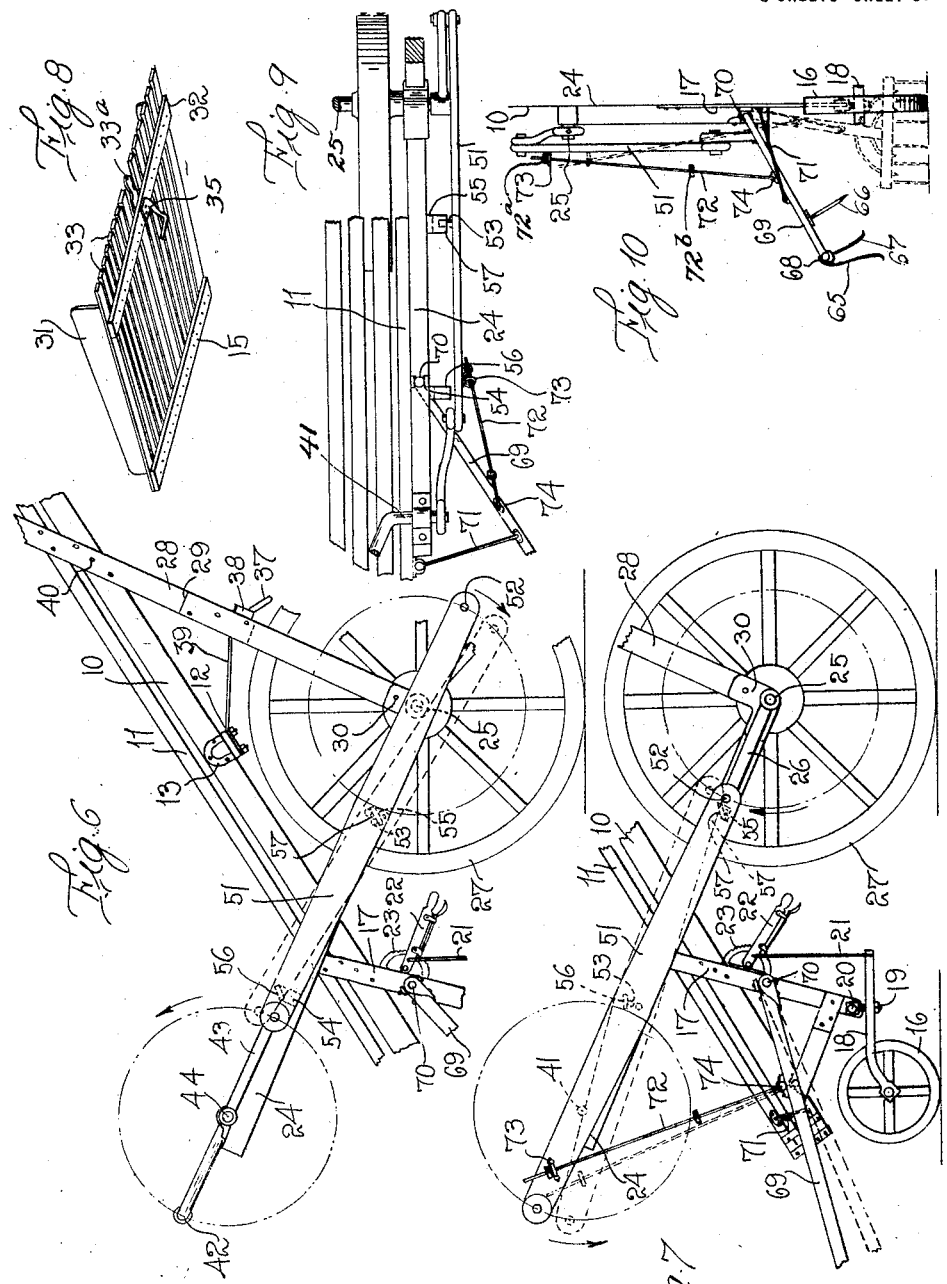

UNITED STATES PATENT OFFICE.

SAMUEL H. GARBER, OF GOSHEN, INDIANA, AND RAY A. GARBER, OF CANTON, ILLINOIS.

HAY-LOADER.

1,365,392.     Specification of Letters Patent.     Patented Jan. 11, 1921.

Application filed May 20, 1918. Serial No. 235,577.

*To all whom it may concern:*

Be it known that we, SAMUEL H. GARBER and RAY A. GARBER, citizens of the United States, residing at Goshen, in the county of Elkhart, in the State of Indiana, and Canton, in the county of Fulton and State of Illinois, respectively, have invented certain new and useful Improvements in Hay-Loaders, of which the following is a specification, reference being had to the accompanying drawings.

This invention relates to loading machines, and particularly to hay loaders.

The general object of this invention is to provide a combined hay loading and raking machine.

A further object is to provide a construction of this character in which the supporting frame of the machine is adjustable to various angles in accordance with the height to which the hay is to be raised.

A still further object is to provide a machine of this character, with a plurality of rake carrying rods coacting with a slatted trough, and provide means whereby, as the machine moves over the ground, the rake carrying rods will be given a general reciprocating movement and the lower ends of the rods will be given a rotary movement toward or from the slatted trough or chute.

A further object is to provide means whereby the lower ends of the rake carrying rods may give or yield as the rake strikes the ground, and a further object in this connection is to so construct the end portions of the rake carrying rods that they shall be downwardly inclined at the time that the rake tines strike the ground so that thereby the rakes may carry a relatively large amount of hay upward upon the elevator trough.

Still another object is to provide a mechanism to this end which includes a crank shaft having cranks thereon operatively engaging the rake carrying arms, and provide improved means for transmitting the power of the traction wheels of the loader to this crank shaft, said means being of such character that the crank shaft be rotated in a direction reverse to that of the direction of rotation of the traction wheels.

A further object is to provide a machine of the character described having reciprocatable and oscillatable rakes, with supplemental rakes designed to gather hay which has not been gathered up by the oscillatable rakes, and provide means whereby the supplemental rakes may be lifted at intervals, so as to discharge the hay gathered thereby into a position to be gathered up by the oscillatable rakes.

A further object of the invention is to improve the details of construction of machines of this character, whereby to render the action of the machine more positive, and increase its effectiveness.

Other objects will appear in the course of the following description.

Our invention is illustrated in the accompanying drawings, wherein:—

Figure 1 is a side elevation of a hay loader constructed in accordance with our invention;

Fig. 2 is a fragmentary side elevation on an enlarged scale of the lower end of one of the rakes;

Figure 5:
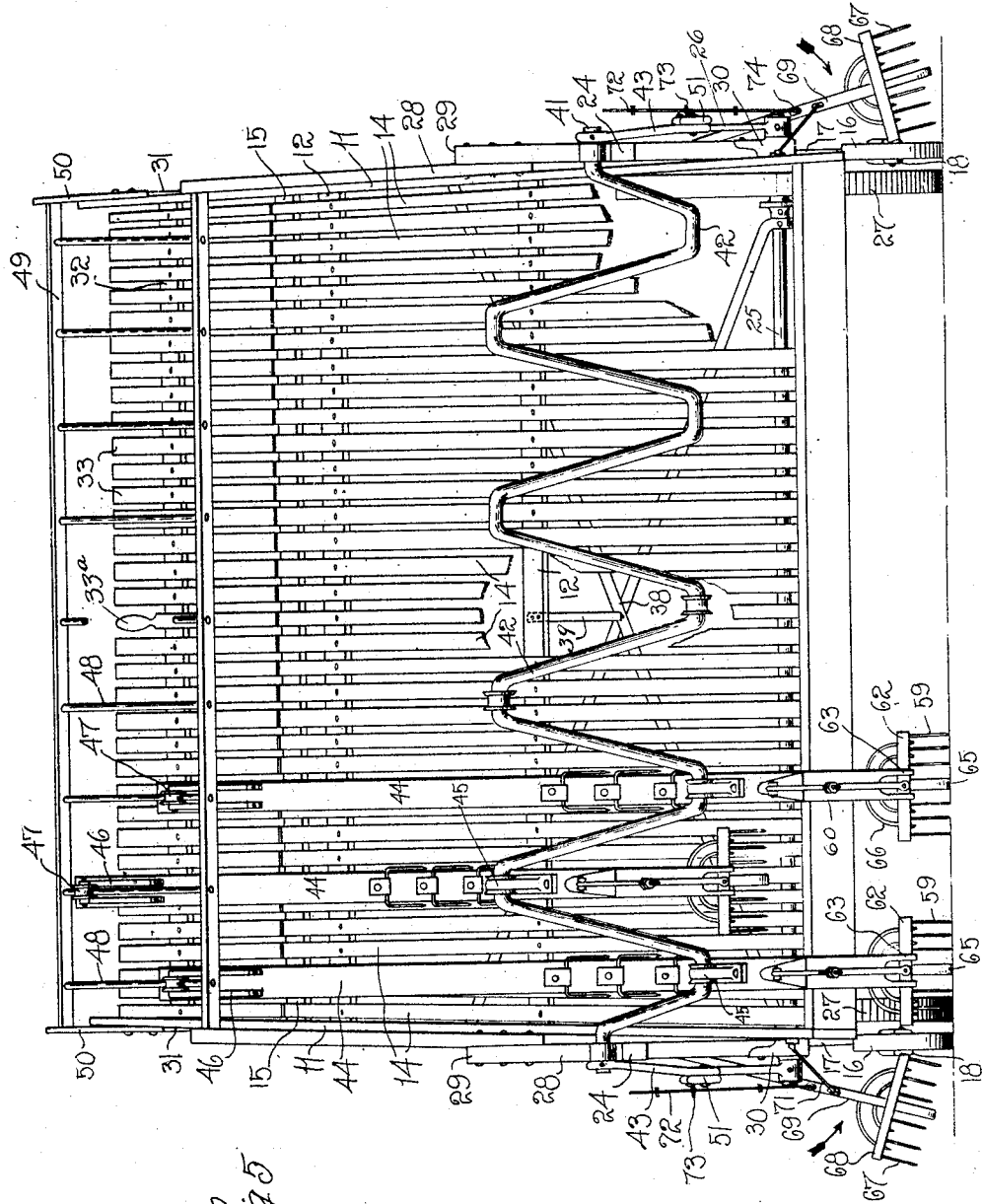

Fig. 2ª is a fragmentary vertical sectional view of a portion of the construction shown in Fig. 2;

Fig. 3 is a fragmentary elevation showing the form of ratchet mechanism for the axle;

Fig. 4 is a side view of one of the crank arms 26 and its corresponding wrist pin;

Fig. 5 is a rear elevation partly broken away of the loader;

Figs. 6 and 7 are fragmentary side elevations somewhat diagrammatic in character to show the operation of the connecting rod 51 and its shiftable fulcrum;

Fig. 8 is a perspective view of the auxiliary conveyer trough;

Fig. 9 is a fragmentary top plan view to illustrate the action of the auxiliary rakes; and Fig. 10 is a fragmentary end elevation for the same purpose.

Referring to the drawing, it will be seen that the machine includes an upwardly and forwardly extending chute or conveyer trough having side bars 10 and 11 spaced from each other and supported in spaced relation, in any suitable manner, the bar 10 having at intervals the cross bars 12, which are connected by straps 13 to the bars 10, these cross bars 12 supporting a plurality of longitudinally extending spaced slats 14, these slats being attached to the several supporting braces or bars 12 and at their upper ends extending over a cross bar 15.

The lower end of the frame is mounted upon wheels 16. To this end, downwardly extending legs 17 are bolted or otherwise attached to the bars 10 and 11, these legs nearly extending vertically downward. The wheels 16 are mounted in forked rods 18, through which pass swivel bolts 19, around which the bars 18 rotate as on a pivot, each of these swivel bolts being bifurcated at its upper end to embrace the leg 17 and being pivotally connected to the leg by means of a bolt 20. A rod 21 extends upward from the forward end of each supporting rod 18 and is connected to a lever 22 operating over a rack 23 in the usual manner. Thus the wheels may be raised and lowered and this construction will permit the wheels to swing when turning and also permits of the wheels being raised or lowered to thereby elevate or depress the rear end of the frame, for a purpose which will be later stated. Attached to the bars 10 and 11, and extending downward and forward over the upper ends of the bars 17 are the frame bars 24 formed at their lower ends with means whereby they may be coupled to the wagon, as will be later stated.

Mounted upon the frame bars 24 is a transverse crank shaft 25, having two crank arms 26 formed thereon, and mounted upon the shaft 25 are the traction wheels, 27, these traction wheels being disposed inward of the frame bars 24 and being of any suitable form. Extending upward from the frame bars 24 and inclined slightly forward are the uprights or standards 28, which are preferably formed in two sections spliced to each other as at 29, the upper sections extending slightly inward, as illustrated in Fig. 5. The lower ends of these uprights are connected to the frame bars 24 and the shaft 25 by means of castings 30. Disposed against the upper ends of the sides 10 of the loading chute are the members 31, these members at their rear ends being connected to the transverse bar 15 and at their forward ends being connected by a transverse bar 32, these bars 15 and 32 carrying longitudinally extending slats 33.

The supplemental trough formed of the members 15, 31, 32 and 33 is designed to be shifted longitudinally upon the upper ends of the bars 10 so as to increase or decrease the effective length of the loading trough, depending upon the height to which the load is to be raised, this adjustment of this supplemental carrier being accomplished by means of a rod 34 which at its upper end is operatively connected to a casting 35 attached to the cross bar 32, this rod at its lower end being provided with a plurality of notches 36 and passing through a ring 37 mounted upon a cross bar 38, which is attached to the uprights 28. By adjusting the rod 34 so that the ring 37 will be disposed in any one of the notches 36, a supplemental carrier formed of the parts 31, 32 and 33 may be held in any desired adjusted position. The cross bar 38 is braced by means of a brace 39 which extends from the middle of the cross bar 38 to the middle of the adjacent cross bar 12. The sectional uprights are bolted to the longitudinal bars 10 and 11 as at 40.

Mounted upon the upper ends of the frame bars 24 is a crank shaft 41 having formed therein a plurality of cranks 42 and having at the ends the crank arms 43. Coacting with each of the cranks 42 is a rake supporting rod 44. The upper end of each rake supporting rod is slidingly supported, as will be later stated, and each rake supporting rod is provided with a bracket 45 extending from the upper face of the rod and through which the corresponding crank 42 passes. The upper end of each rod 44 has attached thereto a hanger 46, this hanger being bifurcated and provided with a roller 47, each roller operating upon a track 48 extending approximately parallel to the side bars 11. These several tracks 48 extend downward and rearward from the cross bar 49, in turn mounted upon brackets 50, bolted to the upper ends of the side bars 10 and 11. It will thus be seen that the upper end of each rake rod is slidingly and pivotally supported upon the corresponding track 48.

For the purpose of giving a general reciprocating motion to the rake rods, and a circular motion in a vertical plane to the lower ends of the rake rods and to the rakes carried thereby, we provide the connecting rods 51, each connecting rod being pivotally connected at its forward end to a wrist pin 52 on the corresponding crank arm 26, the rear end of each connecting rod being connected to a wrist pin on the corresponding crank arm 43. Now it is necessary, in order to secure a proper movement of the rakes, that the shaft 41 shall rotate in a counter-clockwise direction, as illustrated by the arrows in Fig. 1, while, of course, the shaft 25 is obliged to rotate in a clockwise direction. It will be seen from Fig. 1, that the crank arms 26 extend diametrically opposite to the crank arms 43 but are set slightly in advance of the crank arms 43. In other words, when the crank arms 43 are at their lowest position, the crank arms 26 are slightly forward of their highest position. Now if the arms 26 rotate in the direction of the arrow, the connecting rod 51 will tend to pull the corresponding crank arm 43 to a position approximately parallel to the corresponding frame bar 24 and that then, as the crank arm 26 continues to rotate, this pulling movement will be transferred into a pushing movement and the crank arm 43 will be pushed upward and rearward, and then downward and rearward and then brought to its original position. There will be two points, however, in the travel of the crank arm 43 where the crank arm will be on a dead center and if no provision were made for overcoming this dead centering of the crank arms 43, this form of transmission would not operate properly.

In order to overcome this, we have provided each of the connecting rods 51 with an inwardly projecting stud 53 and mount upon the corresponding side bars 24 of the frame, the brackets 54 and 55. These brackets are angular in form and have transversely extending approximately horizontal flanges 56 and 57 respectively at their upper ends. The flange 56 is disposed above the side piece 24 and in an approximately horizontal plane and the flange 57 is disposed below the upper edge face of the side piece 24 and in a horizontal plane. The under face of the flange 56 co-acts with the stud 53 to form a fulcrum for the corresponding connecting rod 51 at one point of its movement, while the upper face of the flange 57 coacts with the stud to form a fulcrum for it at another point in the movement of the connecting rod 51. Thus, as the crank arm 26 moves forward, the connecting rod 51 will move forward and downward with the crank arm, until when the connecting rod has reached the position shown in full lines in Fig. 6, the stud 53 will engage with the flange 57. The stud will ride on this flange, but will also rock on the flange, so that the connecting rod then forms a lever, the forward end of which is moving downward and forward for the first portion of the downward movement, and downward and rearward for the remainder of the downward movement, while the rear end of the lever is moving upward and forward and then upward and rearward, thus carrying the crank 43 past its dead center. The connecting rod will then move rearward, the upper end of the connecting rod moving upward and rearward, until the stud 53 engages beneath the flange 56. At this point the crank arm 26 is moving upward and rearward, which causes the connecting rod 51 to act as a lever, the rear end of which is moving downward and rearward carrying with it the crank 43 past its dead center. Thus it will be seen that in two points of its path of travel the connecting rod is transformed from a mere connecting rod into a lever, to overcome the tendency of the crank arms 43 to stop on their dead centers. It is to be understood that the joints between the connecting rods 51, and the cranks 26 and 43, are somewhat loose so as to permit slight relative movement of the parts sufficient to permit the cranks to turn past their dead centers.

By the mechanism just described, the rear ends of the rake carrying rods 44 are given rotation in a vertical plane through an arc described by the length of the cranks 42. Thus the rake carrying rods 44 will move downward and rearward toward the carrier or chute and will then move upward approximately parallel to the carrier or chute and then the rear ends of the rods will be raised gradually and move rearward and then rearward and downward to the starting point. It will be seen that the cranks 42 extend alternately in opposite directions so that while one series of raking rods is moving upward, the other series is moving downward, so that the hay is always engaged by an upwardly moving series of rake teeth.

Each of the rake carrying rods 44 carries intermediate its ends a series of hay supporting teeth 58, which may be of any suitable construction, and which are preferably forked and the lower end of each rod 44 carries upon it a transverse series of rake teeth 59, as illustrated more fully in Fig. 5. Preferably the lower end of each rod 44 is formed by a hinged section 60 hinged to the body of the rod at 61, the hinged section 60 being yieldingly held in angular relation to the body of the rod by means which will be later described. The rake teeth 59 are mounted upon a transverse head 62. The rake head 62 is rotatably mounted in a casting 63, fastened to the section 60, and a spring 64 acts yieldingly to resist the rotation of the rake head 62. A runner 65 is attached to the rake head and extends downward and rearward slightly below the ends of the tines 59 and acts to prevent the rake from raking the ground too hard. A five-tined rake 66 is also mounted upon the section 60 in advance of the tines 59, so as to take the overload from the gathering rake tines 59.

For the purpose of gathering hay that the outer side rakes would miss, we provide the supplemental rakes 67 and these are mounted upon a rake head 68, which corresponds in every way with the rake head 62, and each of these rake heads is mounted upon an arm 69, which is hingedly and pivotally connected to the corresponding standard 17. The hinge 70 is such that the arm 69 may move upward and laterally outward at the same time. For the purpose of accomplishing this object, we hinge to each of the members 11 at their lower ends, the radius rod 71 which at its outer end is hinged to the arm 69, and for the purpose of transmitting the motion of the corresponding connecting rod 51 to the arm 69, we provide the rod 72, which is swiveled to the connecting arms 69, as at 74, and which is slidingly engaged in the rotatably mounted eye 73 on the connecting rod 51, this eye being such as to permit the rod 72 to swing in a vertical plane parallel to the connecting rod 51 and to simultaneously swing outward in a plane transverse to the rod 51. Stops 72ª and 72ᵇ are mounted at spaced distances upon the rod 72, and the eye 73 moves between these stops. By this means, when the connecting rod moves upward, as illustrated in Fig. 1, the eye 73 will engage the stop 72ª and carry the rod 72 upward, raising the corresponding arm 69 upward, the radius rods 71 acting to shift the lower end of the arm 69 laterally outward so that the rakes 67 are carried laterally outward and upward beyond the path of movement of the adjacent rakes 59, so that these rakes 59 will gather up the hay collected by the rakes 67 and raise this hay. Any hay which has escaped from the adjacent rakes 59 will be gathered up by the supplemental rakes 67 when the supplemental rake is lowered and will be held by this supplemental rake until it again rises and permits the adjacent main rake 59 to engage the hay. As the rear end of the connecting rod 51 moves downward, the rod 72 will be lowered, lowering the corresponding arm 69 with the supplemental rake. If, by any means, the rod 72 should stick, the eye 73 will strike the lower stop 72ᵇ and cause the dislodgment of the rod and the lowering of the corresponding arm 69.

As before remarked, the section 60 is hingedly connected at 61 to the body of the rod 44 and it is desirable to yieldingly hold the section 60 in a downwardly inclined relation to the body of the rod 44 so that the rake teeth will yieldingly press against the ground and also that the rake may gather a relatively large amount of hay and carry it upward upon the trough. While we do not wish to limit ourselves to any specific manner of accomplishing this end, we have illustrated in Fig. 2, a mechanism of a very simple character by which this result can be secured. To this end, there is mounted upon the lower extremity of each of the rods 44 the upwardly or outwardly extending bracket 75. This bracket is formed of a strip of metal bent into U-shape and having a slot 76 adjacent its base and an alining perforation. The upper end of the bracket is provided with the ears 77 and mounted in these ears is an arm 78 having an angular extension 79 vertically slotted at its lower end.

Passing through the arm 78 is a bolt 80, one end of which is screw-threaded for engagement by a nut 80ª which bears against the forward face of the bracket and the other end of which is connected to a coiled contractile spring 81, which is connected to the arm 78. This arm 78 is at all times parallel to the section 60. The extremity of the arm is reduced and screw-threaded and carries the clamping nuts 82, which engage the upper end of the spring or arm 64 which holds the rake teeth in their proper position.

It will be seen, therefore, that the spring 81 will act to hold the section 60 in its inclined position relative to the body of the rod 44 but that when the rake teeth strike the ground, the section 60 and the arm 78 will turn and in turning will expand the spring 81, the tension of the spring tending to bring the parts back to their initial position. This spring exerts sufficient force against the rake at the end of the rake arm as to insure a clean sweep on all kinds of ground. The arm 79, bearing against the bracket, prevents the too great downward movement of the section 60 relative to the section 44.

It is necessary to provide some means whereby this loading apparatus may be connected to travel with the wagon on which the hay is being loaded, and to this end the machine is provided with a tongue 83 carrying at its end a coupling which is adapted to detachably engage with a ring or other suitable shackle on the wagon. As illustrated in Fig. 1, this coupling comprises a casting 84, which is formed to embrace the tongue 83 and is formed to provide an upwardly extending hook 85 spaced from the body of the casting. The casting is provided with an ear 86, in which is pivoted an angular keeper 87, the outwardly projecting arm of which is provided with a socket to receive the upper end of the hook 85. The lower end of the downwardly extending arm of the keeper is normally engaged by a detent latch 88 pivoted at 89, this latch being urged into position by a spring 90, the rear end of the latch being engaged by a release cord 91 and extending up over a pulley 92. This cord is conducted by any suitable means, as by pulleys, for instance, to the operator on the load and when the wagon has been sufficiently loaded, the operator pulls the cord 91 releasing the latch, whereupon the weight of the tongue 83 causes the ring or shackle connected to the wagon to lift the keeper 87 so that the ring will slide off of the hook 85 and the loader will become detached from the wagon.

It is, of course, necessary to provide means whereby the driving axle or shaft 25 shall be operatively engaged with the traction wheels 27 upon a forward movement of the loader, but may be automatically disengaged from these traction wheels upon a rearward movement of the loader. We may use any means to this end, as for instance, such a pawl and ratchet connection, as is used on harvesting machinery, manure spreaders, etc. We have illustrated in Fig. 3, means which is preferably used for this purpose. The axle or the shaft 25 carries upon it a ratchet wheel 94 and the hub 95 of the traction wheel 27 carries upon it the housing 96 which incloses the ratchet wheel. This housing is slotted upon its face and mounted upon the housing is a pawl 97. This pawl is mounted on a transverse pivot pin 98, in ears 99 and connected to the pawl is an arm 100, which is attached to a spring 101, the other end of which is engaged with the housing 96. By this construction, when the arm 100 is disposed in the position shown in Fig. 3, the spring will urge the pawl against the ratchet teeth, but the arm 100 may be shifted downward in Fig. 3, whereupon the spring 101 will pass the center of the pin 98 and hold the pawl away from the teeth. Thus it is a simple matter to render the pawl operative or inoperative.

While we have illustrated certain details of construction and a detailed arrangement for certain parts of the device, it is obvious that the general construction and these detailed parts might be changed in many ways, without departing from the spirit of the invention.

The general operation of this machanism is as follows: The tongue 83 is connected to the wagon by means of the coupling heretofore described and then as the loader is drawn along behind the wagon, the rake carrying bars 44 will be oscillated causing the hay to be carried up the slatted trough until its discharge at the upper end of the trough onto the wagon. As the load grows higher, the supplementary trough formed by the members 31 and the slats 33 may be shifted by means of the handle 33ᵃ so as to shift this supplementary carrier or trough upward so that the loader will discharge at a greater height, or the supplementary trough or carrier may be adjusted before the machine is started into operation. The caster wheels 16 will turn so as to permit the loader to track after the wagon and by shifting the lever 22 the rear end of the loader may be raised or lowered either to carry the rakes entirely off of the ground as in moving across a field, or to bring the rakes into proper raking position. Of course it will be understood that the uprights 28 may be braced from each other in any suitable manner, as by crossed braces 38, see Fig. 5, and that the supporting frame may be formed of any suitable material, as for instance of angle iron or channel iron as may be deemed the most expedient.

Having described our invention, what we claim is:

1. A hay loader comprising a supporting frame including an upwardly extending carrier trough, traction wheels mounted upon the frame, a plurality of rake carrying rods disposed above the trough and slidingly and oscillatably supported with their upper ends, a crank shaft operatively engaged at the lower ends of the rake carrying rods and having a crank arm, a shaft operatively engaged by the traction wheels and having a crank arm, the crank shafts being rotatable in opposite directions, and a connecting rod pivotally connected to both of said crank arms.

2. A hay loader comprising a supporting frame including an upwardly extending carrier trough, traction wheels mounted upon the frame, a plurality of rake carrying rods disposed above the trough and slidingly and oscillatably supported with their upper ends, a crank shaft operatively engaged at the lower ends of the rake carrying rods and having a crank arm, a shaft operatively engaged by the traction wheels and having a crank arm, the crank shafts being rotatable in opposite directions, and a connecting rod pivotally connected to both of said crank arms, the rake supporting crank shaft being disposed in a horizontal plane above the plane of the second named crank shaft.

3. A hay loader including a supporting frame, an upwardly extending carrier trough, and a plurality of rake carrying rods disposed above the trough for reciprocating movement, and means for causing the lower ends of the rods to travel in a circular path, including parallel crank shafts having crank arms, the crank shafts being rotatable in opposite directions, one of said crank shafts being operatively connected to the rake carrying arms and the other of said crank shafts being operatively connected to the traction wheels to rotate therewith, a connecting rod connecting said crank arms, a pivot member on the connecting rod, and a pair of fulcrum members mounted on the supporting frame, with which the pivot member on the connecting rod engages when the crank arms are approximately in line with the connecting rod to thereby cause the crank arms to pass their dead centers.

4. A hay loader including a supporting frame having traction wheels, an upwardly inclined carrier trough mounted thereon, longitudinally extending rake carrying rods disposed above the trough and having reciprocating and rocking engagement with the upper end of the trough, a crank shaft having operative engagement with the lower ends of said rods, a driving shaft operatively connected to the traction wheels and having a crank arm, a crank arm on the crank shaft, said arms rotating in opposite directions, and the arm on the driving shaft being disposed at an angle in advance of the arm on the crank shaft, a connecting rod pivotally connected to the two arms, and having an outwardly projecting pivot member, and a pair of longitudinally spaced fulcrum members mounted upon the frame with one or the other of which the pivot member engages when the crank arms are approximately in line with the connecting rod.

5. In a mechanism of the character described, a driving shaft and a parallel driven shaft, each of said shafts being provided with a crank arm and said shafts rotating in opposite directions, the crank arm of the driving shaft having an angular advance over the crank arm on the driven shaft, a connecting rod pivotally connected to both of said crank arms and carrying a medially disposed pivot stud, and a pair of longitudinally separated fixedly supported fulcrum members with which the pivot stud engages when the crank arms are approximately in line with said connecting rod, said pivot stud engaging with the outer face of the member adjacent the driving shaft and with the under face of the member adjacent the driven shaft to thereby overcome the dead centers of said crank arms.

6. A mechanism of the character described including a supporting frame having upwardly and rearwardly extending members, a crank shaft mounted upon the upper end of said frame and having a crank arm, a driving shaft mounted upon the lower end of the frame and having a crank arm, said shafts being rotatable in opposite directions, and the crank arm of the driving shaft being disposed in advance of the crank arm on the driven shaft, a connecting rod pivotally connected to the ends of the crank arms and communicating power from one shaft to the other, said connecting rod having a laterally projecting stud, and fulcrum members mounted upon said upwardly and rearwardly inclined supporting member and disposed in the path of movement of the stud whereby the connecting rod may operate as a lever when the stud engages either of said fulcrum members, the stud engaging said fulcrum members when the crank arms are approximately in line with the connecting rod to thereby overcome the dead centers of said crank arms.

7. A hay loader including a plurality of oscillating and reciprocating rake carrying rods, the rods having rake carrying sections jointed to them at their lower ends, and springs yieldingly holding said sections in angularly depressed relation to the rake carrying rods.

8. A hay loader including longitudinally reciprocating rake and vertically oscillatable carrying rods formed in two jointed sections, one of said sections carrying rake teeth, springs yieldingly holding the said sections in a depressed angular relation to the rake carrying rods, and means for giving a movement of rotation in a vertical plane to the rake carrying rods.

9. In a device of the character described, a longitudinally reciprocatable, vertically oscillatable rake carrying rod, a rake head pivotally mounted upon the extremity of the rod for rotation in a vertical plane, a spring yieldingly resisting said rotation, rake tines extending from said head, and a resilient runner mounted upon the head and extending beyond and slightly below the rake tines and acting to initially engage with the ground and support said rake head.

10. A hay loader including a supporting frame, an upwardly extending carrier trough, a plurality of rakes, each moving in a closed path, means for giving a circular movement to the said rakes, laterally disposed gathering rakes normally disposed forward of the first named rakes, and means for shifting the laterally disposed rakes outward and upward out of operative position upon a forward movement of the first named rakes.

11. A hay loader including a wheeled supporting frame having an upwardly and forwardly extending carrier trough, a plurality of rakes operatively supported upon the frame and coacting with the trough, means for giving a movement of rotation in a vertical plane to said rakes and in a direction to cause the rakes to move downward into engagement with the ground and then move forward and upward, laterally disposed rakes operatively supported upon the frame in advance of the first named rakes when the latter are in contact with the ground, and means for shifting said second named rakes laterally outward and simultaneously upward as the first named rakes move forward and upward.

12. A hay loader including a wheeled supporting frame, an upwardly and forwardly extending carrier trough, a plurality of rake carrying bars disposed above the trough and mounted at their upper ends for reciprocation and oscillation in a vertical plane, means for giving a movement of rotation in a vertical plane to the lower ends of said rods, rakes carried upon the lower ends of said rods, a pair of laterally disposed rake carrying arms hingedly mounted at their forward ends upon said frame for vertical and lateral oscillation, rakes mounted upon the rear ends of said arms and disposed in advance of the first named rakes, when said first named rakes initially engage the ground, a radius rod mounted for vertical movement upon the frame of the machine and pivotally connected to the corresponding arm to thereby give the arm lateral movement upon a vertical movement of the arm, and means connected to the rake rod operating mechanism for intermittently lifting said arms as the first named rakes move forward.

13. A hay loader including a wheeled supporting frame, an upwardly and forwardly extending carrier trough, a crank shaft mounted at the rear of said supporting frame and having a plurality of cranks, a plurality of rake supporting rods operatively connected adjacent their lower ends with said cranks and disposed above and co-acting with the carrier trough, rakes mounted at the rear ends of the rods, a crank arm mounted on the crank shaft, a driving shaft operatively connected to the traction wheels and having a crank arm, the driving shaft and the crank shaft operating in opposite directions, a reciprocating and rocking connecting rod operatively connected to the crank arms to transmit motion from the driving shaft to the crank shaft, laterally disposed auxiliary rake carrying arms operatively connected to the frame of the machine for vertical movement and lateral oscillation, radius rods mounted upon the lower end of the carrier for movement in a vertical plane and pivotally connected each to the corresponding arm, a connecting rod between each arm and the adjacent end of the first named corresponding connecting rod, and a swiveled connection between the two connecting rods.

14. A hay loader including a plurality of longitudinally reciprocatable vertically oscillatable rake carrying rods having rearwardly and downwardly extending sections jointed thereto and carrying rakes, means for giving a movement of rotation in a vertical plane to the rake carrying rods, means for yieldably holding the sections in depressed angular relation to the rake carrying rods, said means comprising a bracket on each rod, an arm pivoted to the bracket and operatively connected to the jointed section of the rake carrying rod, and a spring operatively engaging said arm and bracket and yieldingly holding the arm and sections depressed relative to the body of the rod.

15. In a raking device, a vertically oscillatable and longitudinally reciprocatable rod, a section jointed thereto for movement in a vertical plane and carrying rake tines, a bracket extending outward from the rod adjacent the joint of the section, an arm extending parallel to the section and pivotally mounted upon the bracket and having an angular extension at its rear end, a contractile spring connected to the arm, and a bolt connected to the spring passing through the angular extension and through the bracket and having an adjusting nut thereon.

16. In a raking device, a vertically oscillatable and longitudinally reciprocatable rod, a section jointed thereto for movement in a vertical plane and carrying rigid rake tines, and carrying pivoted rake tines, a bracket extending outward from the rod adjacent the joint of the section, an arm extending parallel to the section and pivotally mounted upon the bracket, a spring operatively engaging said arm and the bracket and urging the arm and sections depressed, and a spring operatively connected to the pivoted tines of the section and to the extremity of the arm whereby to yieldingly resist turning movement of the pivoted tines.

In testimony whereof we hereunto affix our signatures.

SAMUEL H. GARBER.
RAY A. GARBER.